(12) United States Patent
Yajima et al.

(10) Patent No.: US 10,141,772 B2
(45) Date of Patent: Nov. 27, 2018

(54) COMMUNICATION DEVICE (71) Applicant: Panasonic Intellectual Property Management Co., Ltd., Osaka (JP)

(72) Inventors: Hiroshi Yajima, Osaka (JP); Takashi Inoue, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 50 days.

(21) Appl. No.: 15/349,799

(22) Filed: Nov. 11, 2016

(65) Prior Publication Data
US 2017/0149268 A1    May 25, 2017

(30) Foreign Application Priority Data
Nov. 24, 2015 (JP) ................. 2015-228328

(51) Int. Cl.
*H02J 7/02* (2016.01)
*H02J 50/10* (2016.01)
*H04B 5/00* (2006.01)

(52) U.S. Cl.
CPC .............. *H02J 7/025* (2013.01); *H02J 50/10* (2016.02); *H04B 5/0031* (2013.01); *H04B 5/0037* (2013.01); *H04B 5/0081* (2013.01)

(58) Field of Classification Search
CPC .......... H02J 7/025; H02J 50/10; H02J 7/0052; H04B 5/0031
USPC ........................................ 320/107, 108, 114
See application file for complete search history.

(56) References Cited

U.S. PATENT DOCUMENTS

| 2014/0168019 | A1 | 6/2014 | Hirobe et al. | |
| 2014/0291404 | A1 | 10/2014 | Matsuoka et al. | |
| 2014/0333253 | A1 | 11/2014 | Suzuki et al. | |
| 2014/0375262 | A1* | 12/2014 | Yamaguchi | H02J 50/90 320/108 |
| 2015/0123604 | A1* | 5/2015 | Lee | H01F 38/14 320/108 |
| 2016/0218549 | A1 | 7/2016 | Hirobe et al. | |

FOREIGN PATENT DOCUMENTS

| JP | 2013-017108 | 1/2013 |
| JP | 2013-098846 | 5/2013 |
| JP | 2015-130566 | 7/2015 |
| WO | 2014/155424 | 10/2014 |

* cited by examiner

*Primary Examiner* — Edward Tso
*Assistant Examiner* — Aaron Piggush
(74) *Attorney, Agent, or Firm* — McDermott Will & Emery LLP (57) ABSTRACT

A communication device includes a substrate, a magnetic sheet disposed above an upper surface of the substrate, a first coil disposed above an upper surface of the magnetic sheet, a second coil having a portion facing an edge surface of the substrate in a direction parallel with the upper surface of the substrate, and an electronic component disposed on the upper surface of the substrate. The electronic component is configured to generate noise. The magnetic sheet has a portion overlapping the second coil viewing from above. The electronic component is exposed from the magnetic sheet viewing from above. This communication device has a small size and prevents influence of noise generated by the electronic component.

9 Claims, 7 Drawing Sheets

COMMUNICATION DEVICE

TECHNICAL FIELD

The present disclosure relates to a communication device.

BACKGROUND ART

Recent wireless terminals are in increasing demand for charging (noncontact charging) a battery through noncontact power transmission and for Near Field Communication (NFC). Noncontact charging and NFC typically utilize coils, hence requiring a device to include plural coils. Especially a small device has the coils close to one another. In this case, electromagnetic coupling between the coils may degrade, e.g. the power transmission efficiency and a communication distance.

Japanese Patent Laid-Open Publication No. 2013-98846 discloses a conventional device including a first magnetic body, a first coil, a second magnetic body, and a second coil stacked in sequence on a substrate. This structure reduces the strength of electromagnetic coupling between the first and second coils to prevent the performance deterioration due to electromagnetic coupling.

SUMMARY

A communication device includes a substrate, a magnetic sheet disposed above an upper surface of the substrate, a first coil disposed above an upper surface of the magnetic sheet, a second coil having a portion facing an edge surface of the substrate in a direction parallel with the upper surface of the substrate, and an electronic component disposed on the upper surface of the substrate. The electronic component is configured to generate noise. The magnetic sheet has a portion overlapping the second coil viewing from above. The electronic component is exposed from the magnetic sheet viewing from above.

This communication device has a small size and prevents influence of noise generated by the electronic component.

DETAILED DESCRIPTION OF PREFERRED EMBODIMENT

Figure 1A:
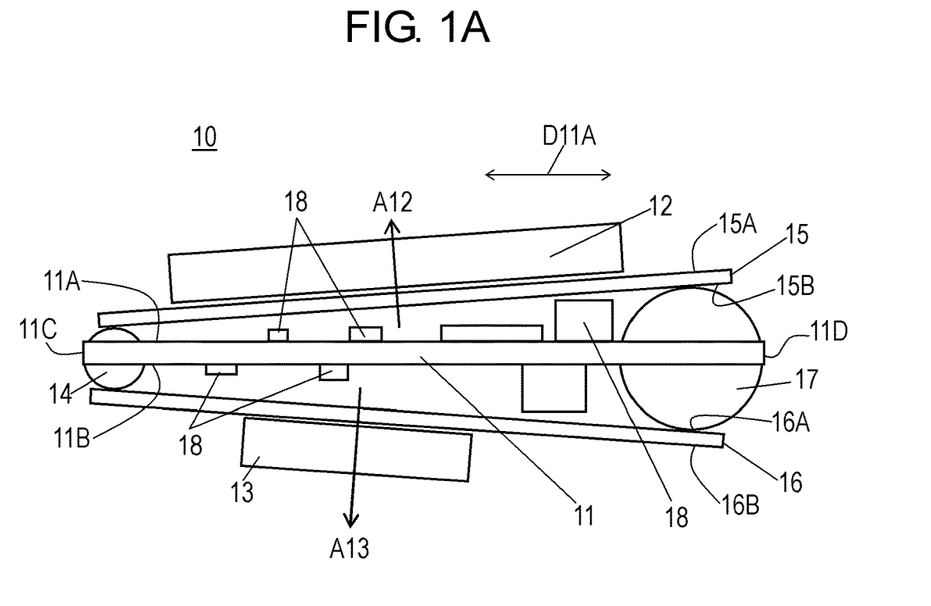
FIG. 1A is a side view of a communication device according to an exemplary embodiment.
Figure 1B:
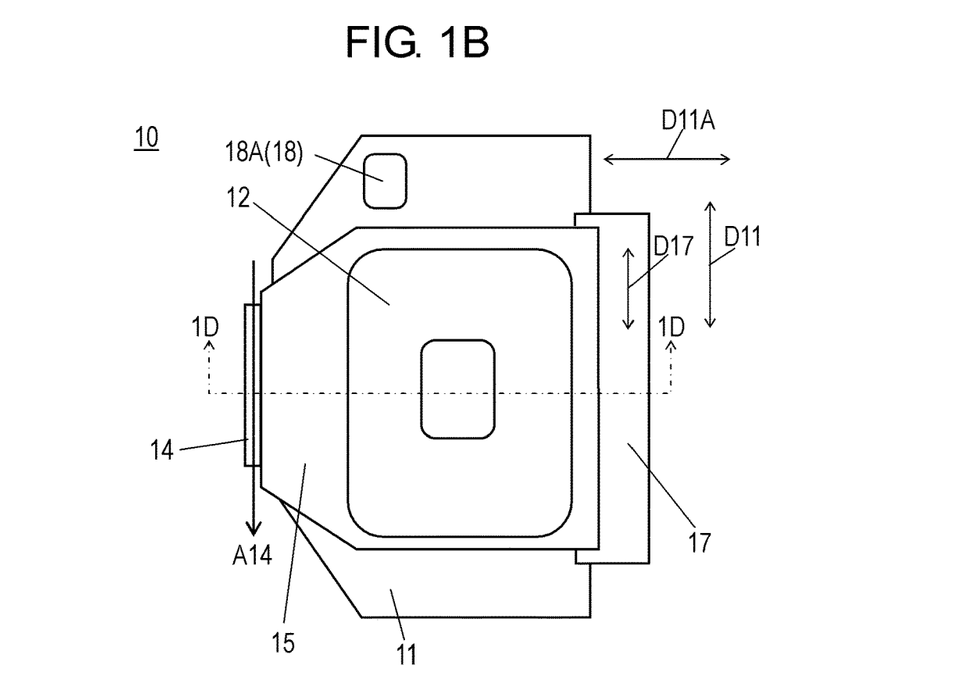
FIG. 1B is a top view of the communication device according to the embodiment.
Figure 1C:
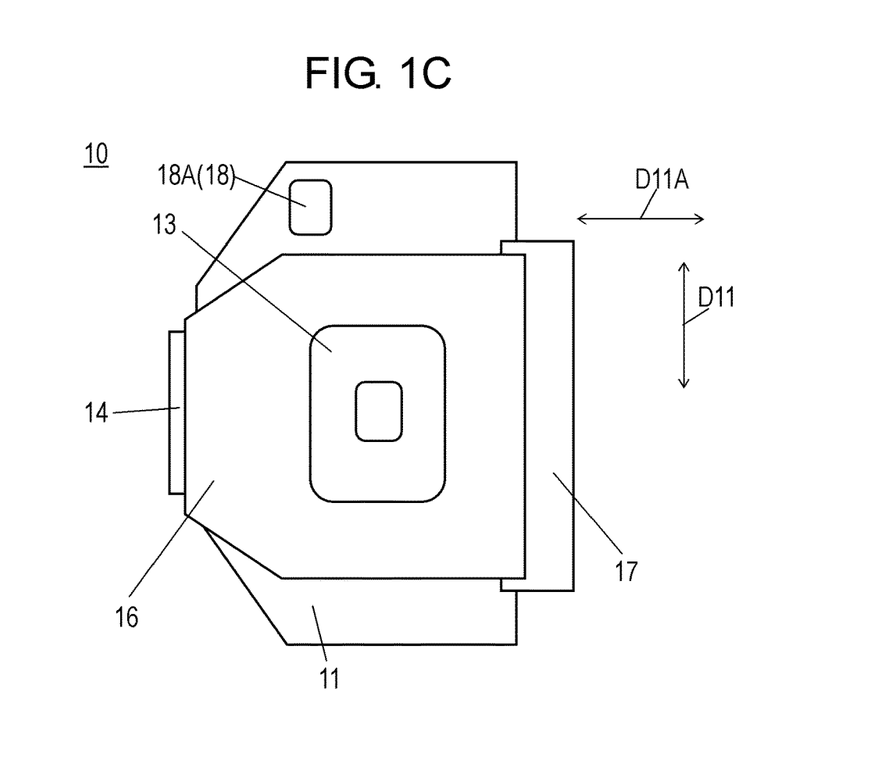
FIG. 1C is a bottom view of the communication device according to the embodiment.
Figure 1D:
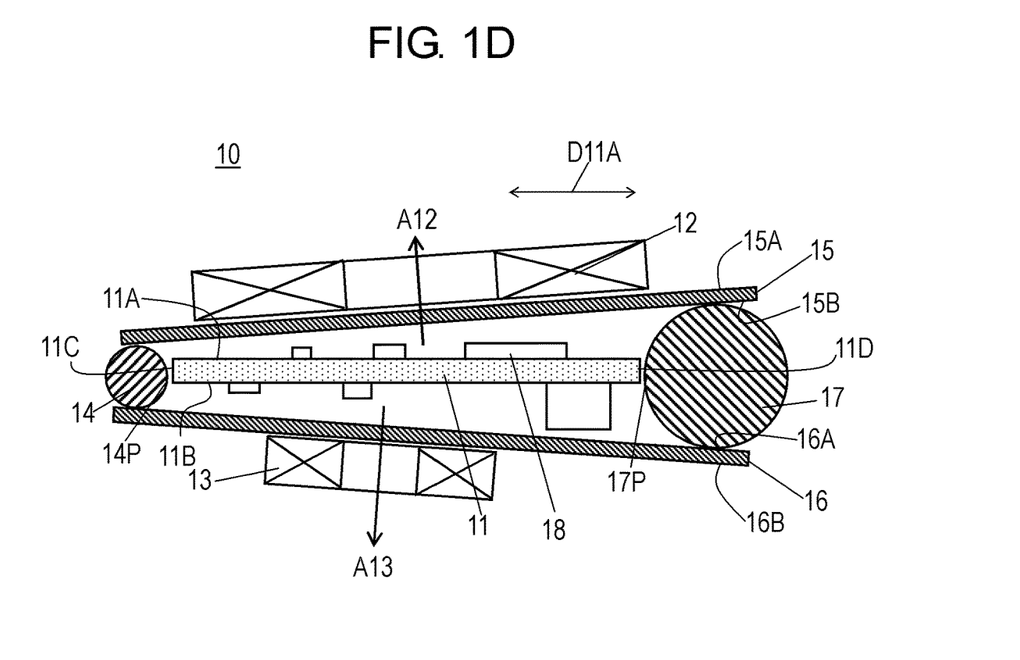
FIG. 1D is a sectional view of the communication device on line 1D-1D shown in FIG. 1B.

FIG. 1A is a side view of communication device 10 according to an exemplary embodiment. FIGS. 1B and 1C are a top view and a bottom view of communication device 10, respectively. FIG. 1D is a sectional view of communication device 10 on line 1D-1D shown in FIG. 1B.

Communication device 10 includes substrate 1, coils 12, 13, and 14, magnetic sheets 15 and 16, battery 17, and electronic components 18. Communication device 10 is so small that it can be mounted inside an oral cavity.

(Substrate 11)

Figure 2:
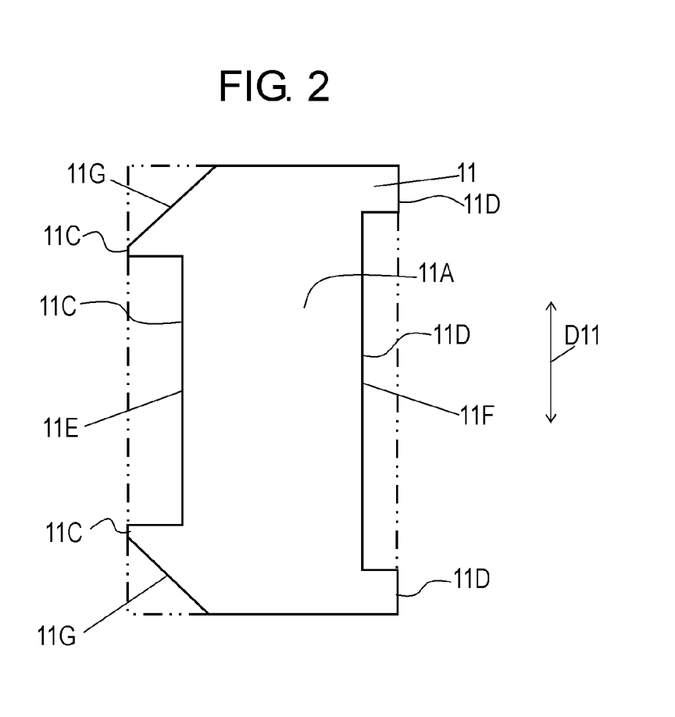
FIG. 2 is a top view of a substrate of the communication device according to the embodiment.
Figure 3:
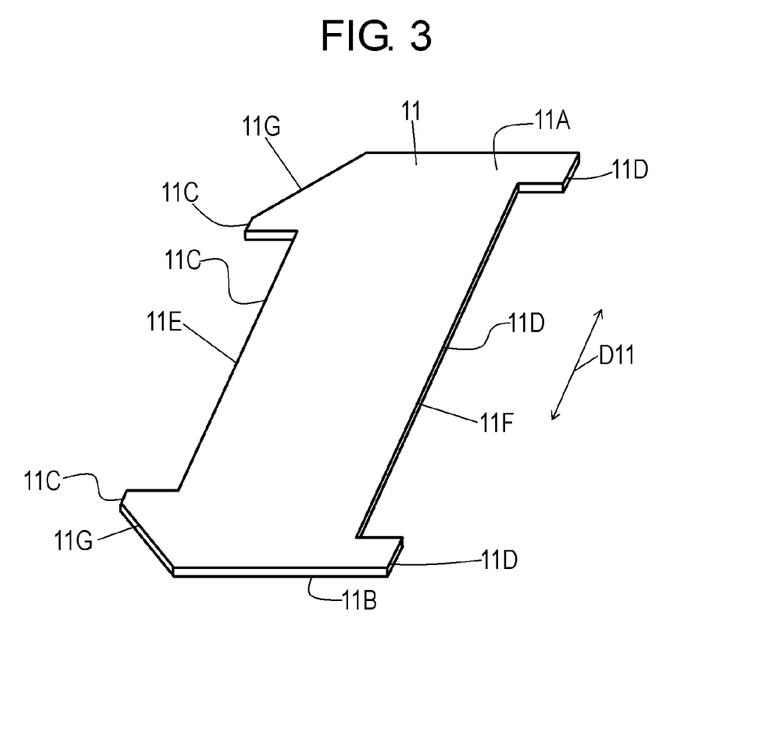
FIG. 3 is a perspective view of the substrate of the communication device according to the embodiment.

FIGS. 2 and 3 are a top view and a perspective view of substrate 11, respectively. According to the embodiment, substrate 11 is a printed circuit board for an electronic circuit with a substantially rectangular solid shape. Substrate 11 has upper surface 11A, lower surface 11B opposite to upper surface 11A, edge surface 11C connected to upper surface 11A and lower surface 11B, and edge surface 11D connected to upper surface 11A and lower surface 11B. Edge surface 11D is opposite to edge surface 11C. Substrate 11 extends slenderly in longitudinal direction D11. Edge surface 11C is perpendicular to upper surface 11A and parallel with longitudinal direction D11. In view of communication device 10 including substrate 11 mounted inside the oral cavity, the length of substrate 11 in longitudinal direction D11 is preferably less than about 25 mm.

Communication device 10 according to the embodiment includes the following components. Magnetic sheet 15 and coil 12 are disposed above upper surface 11A, as shown in FIG. 1D. Coil 14 has portion 14P facing edge surface 11C in direction D11A parallel with upper surface 11A of substrate 11. Magnetic sheet 16 and coil 13 are disposed below lower surface 11B of substrate 11. Battery 17 has portion 17P facing edge surface 11D of substrate 11 in direction D11A, as shown in FIG. 1D.

The conventional device disclosed in Japanese Patent Laid-Open Publication No. 2013-98846 is a mobile wireless terminal, such as a mobile-phone terminal or a smartphone, which allows two coils to be disposed in a relatively large space. A very small device, such as a wearable communication device mountable inside the oral cavity, requires to modulate components, such as coils, a battery, and other electronic devices, thereby having a small size.

In the conventional device disclosed in Japanese Patent Laid-Open Publication No. 2013-98846, electromagnetic noise generated by an electronic component on the substrate can propagate through magnetic bodies to coils to induce quality deterioration in wireless communications.

As shown in FIGS. 1A to 1D and 2, in communication device 10 according to the embodiment, substrate 11 has cutouts 11E and 11F provided in edge surfaces 11C and 11D. Coil 14 is disposed in cutout 11E while battery 17 is disposed in cutout 11F. This configuration decreases the size of communication device 10 including substrate 11 to be downsized.

Figure 4:
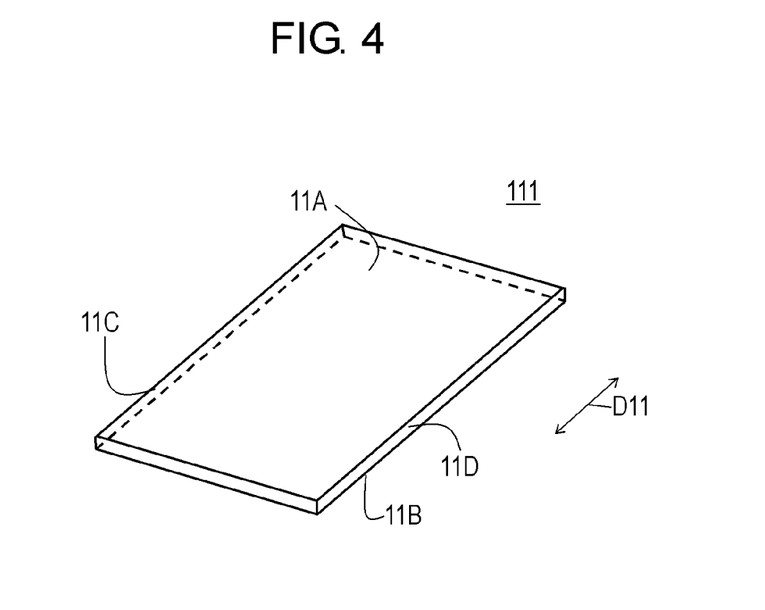
FIG. 4 is a perspective view of another substrate of the communication device according to the embodiment.

FIG. 4 is a perspective view of another substrate 111 according to the embodiment. In FIG. 4, components identical to those of substrate 11 shown in FIGS. 2 and 3 are denoted by the same reference numerals. Substrate 111 shown in FIG. 4 does not have cutouts 11E and 11F provided in edge surfaces 11C and 11D of substrate 11 shown in FIG. 2. A communication device including substrate 111 instead of substrate 11 as well can have a small size; however, communication device 10 including substrate 11 can have a smaller size.

According to the embodiment, the length of coil 14 in longitudinal direction D11 is larger than the length of battery 17 in longitudinal direction D11. The length of cutout 11E in longitudinal direction D11 is determined to fit that of coil 14 in longitudinal direction D11, hence allowing the length of cutout 11E to be smaller than that of cutout 11F.

In the above structure, both ends of edge surface 11C have cutouts 11G. Cutouts 11G further decreases the size of communication device 10 including substrate 11, allowing the shape of communication device 10 to be mountable inside the oral cavity.

Figure 5:
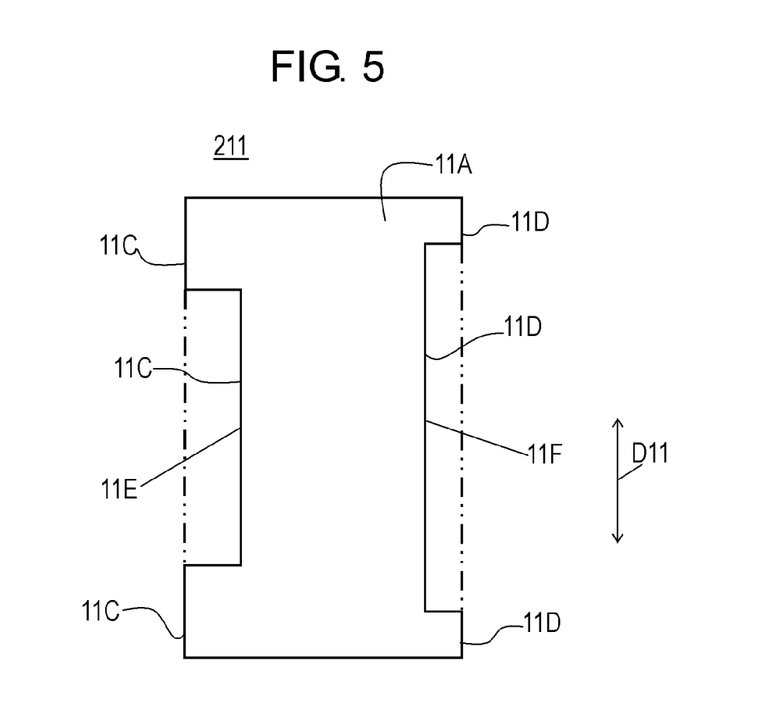
FIG. 5 is a top view of still another substrate of the communication device according to the embodiment.

FIG. 5 is a top view of still another substrate 211 according to the embodiment. In FIG. 5, components identical to those of substrate 11 shown in FIGS. 2 and 3 are denoted by the same reference numerals. Substrate 211 shown in FIG. 5 does not have cutouts 11G provided at both ends of substrate 11 shown in FIG. 2. A communication device including substrate 211 instead of substrate 11 can have a small size; however, communication device 10 including substrate 11 can have a smaller size.

(Configuration of Communication Device 10)

As shown in FIG. 1A, communication device 10 includes substrate 11, magnetic sheet 15 disposed above upper surface 11A of substrate 11, coil 12 disposed on upper surface 15A of magnetic sheet 15, coil 14 having portion 14P facing edge surface 11C of substrate 11 in direction D11A, and electronic components 18 disposed on upper surface 11A of substrate 11. Coil 12 functions as a coil for noncontact charging. Coil 14 functions as a coil for Near Field Magnetic Induction.

Communication device 10 may further include magnetic sheet 16 disposed below lower surface 11B, coil 13 disposed on lower surface 16B of magnetic sheet 16, and battery 17 having portion 17P facing edge surface 11D. According to the embodiment, coil 13 functions as a coil for Near Field Communication.

Magnetic sheet 15 has lower surface 15B facing upper surface 11A of substrate 11 and upper surface 15A opposite to lower surface 15B. Upper surface 15A and lower surface 15B of magnetic sheet 15 are substantially parallel with upper surface 11A of substrate 11. According to the embodiment, upper surface 15A and lower surface 15B of magnetic sheet 15 may incline by an angle ranging from about −10 degrees to +10 degrees with respect to upper surface 11A of substrate 11. Thus, coil 12 disposed on upper surface 15A of magnetic sheet 15 is substantially parallel with upper surface 11A of substrate 11. According to the embodiment, coil 12 may incline by an angle ranging from about −10 degrees to +10 degrees with respect to upper surface 11A of substrate 11.

Magnetic sheet 16 has upper surface 16A facing lower surface 11B of substrate 11 and lower surface 16B opposite to upper surface 16A. Upper surface 16A and lower surface 16B of magnetic sheet 16 are substantially parallel with lower surface 11B of substrate 11. According to the embodiment, upper surface 16A and lower surface 16B of magnetic sheet 16 may incline by an angle ranging from about −10 degrees to +10 degrees with respect to upper surface 11B of substrate 11. Coil 13 disposed on lower surface 16B of magnetic sheet 16 is substantially parallel with lower surface 11B of substrate 11. According to the embodiment, coil 13 may incline by an angle ranging from about −10 degrees to +10 degrees with respect to upper surface 11B of substrate 11.

As shown in FIG. 1A, coils 12 and 13 are composed of conductive wires wound about axes A12 and A13, respectively. In the above geometry of coils 12 and 13, axis A12 of coil 12 is substantially parallel with axis A13 of coil 13. According to the embodiment, axis A13 of coil 13 may incline by an angle ranging from about −20 degrees to +20 degrees with respect to axis A12 of coil 12. Axis A13 of coil 13 may incline preferably by an angle ranging from about −10 degrees to +10 degrees with respect to axis A12 of coil 12. As shown in FIGS. 1A and 1B, coil 14 is composed of a conductive wire wound about axis A14 extending in longitudinal direction D11. Axes A12 and A13 of coils 12 and 13 extend substantially perpendicularly to axis A14 of coil 14.

According to the embodiment, Axes A12 and A13 of coils 12 and 13 may incline by an angle ranging from about 75 degrees to 105 degrees with respect to axis A14.

The above configuration provides communication device 10 with a size small enough to be used in the oral cavity.

(Coil 12)

According to this embodiment, coil 12 is a coil for power transmission/communication aiming, e.g. noncontact charging. Coil 12 is a slim coil composed of a conductor wound about axis A12 in an elliptical ring shape.

Figure 6:
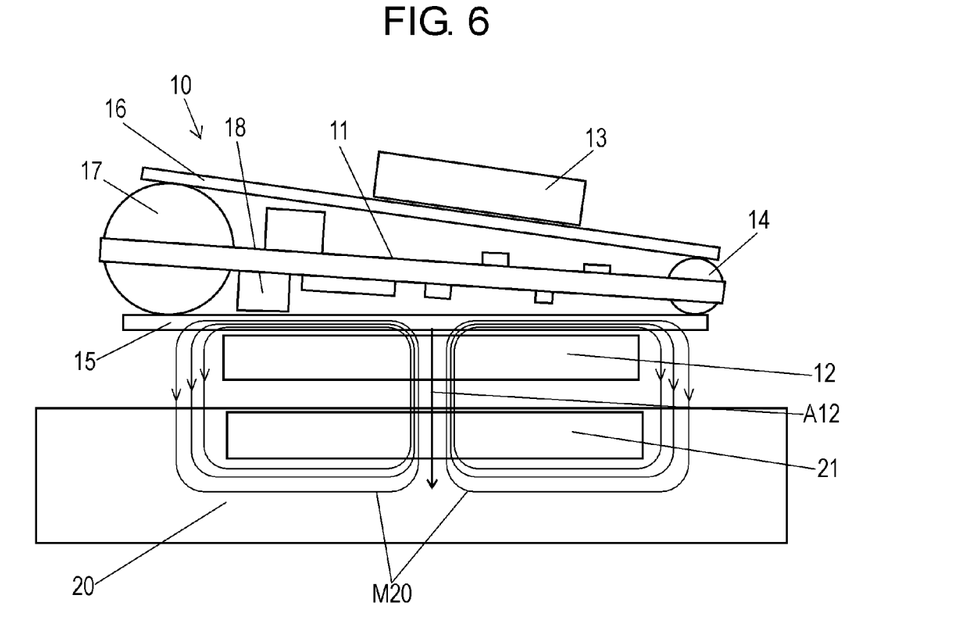
FIG. 6 is a schematic diagram of the communication device according to the embodiment combined with a charging device.

FIG. 6 is a schematic diagram of communication device 10 combined with charging device 20. As shown in FIG. 6, coil 12 is disposed as to face feeding unit 21 of charging device 20. Feeding unit 21 generates external magnetic flux M20 which crosses coil 12. Coil 12 generates power based on electromagnetic induction resulting from external magnetic flux M20. The generated power charges battery 17.

In noncontact charging, metal, such as a battery case or a printed circuit board, existing near the power-receiving coil induces an eddy current in the metal so as to oppose change in magnetic flux from the charging device (the feeding side), which generates reactive magnetic flux. This eddy current causes induction heating to possibly disable normal noncontact feeding due to the reactive magnetic flux.

Communication device 10 according to the embodiment includes coil 12 disposed above upper surface 15A of magnetic sheet 15. As shown in FIG. 1B, the area of magnetic sheet 15 is larger than that of coil 12 viewing from above.

This structure causes external magnetic flux M20 from charging device 20 to concentrate into magnetic sheet 15 to prevent an eddy current, which reduces heat generation. The lower magnetism loss increases the efficiency of charging.

(Coil 13)

Figure 7:
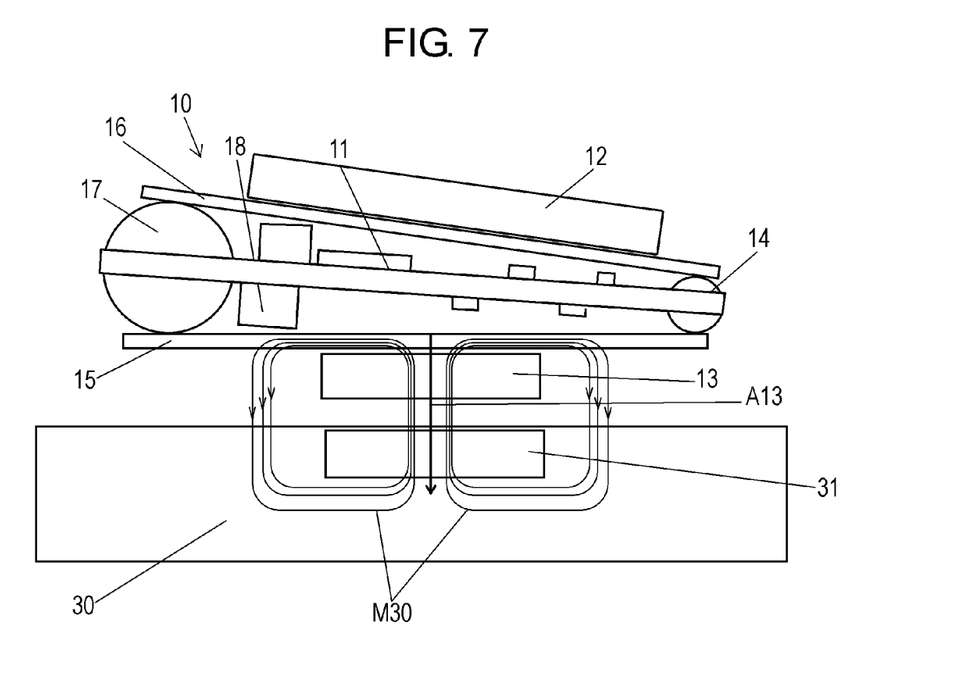
FIG. 7 is a schematic diagram of the communication device according to the embodiment combined with an external device.

FIG. 7 is a schematic diagram of communication device 10 combined with external device 30 such as a reader/writer. According to the embodiment, coil 13 is a coil for Near Field Communication (NFC) that communicates with external device 30 using radio waves in a frequency band of, e.g. 13.56 MHz aiming at, e.g. pairing between devices. Coil 13 is a slim coil composed of a conductor wound about axis A13 in an elliptical ring shape. The diameter of coil 13 is smaller than that of coil 12. Coil 13 is disposed so as to face communication unit 31 of external device 30.

In Near Field Communication (NFC), a metal, such as a battery case or a printed circuit board, existing near the power-receiving coil induces an eddy current in the metal so as to oppose a change of external magnetic flux M30 from external device 30, such as a reader/writer, which generates reactive magnetic flux. This reactive magnetic flux blocks a magnetic field required for communications, possibly causing communication failures.

As shown in FIG. 1A, communication device 10 according to the embodiment includes coil 13 disposed below lower surface 16B of magnetic sheet 16. Further, as shown in FIG. 1C, the area of magnetic sheet 16 is larger than that of coil 13.

This structure causes magnetic flux from external device 30 to concentrate into magnetic sheet 16 to prevent an eddy current. This decreases magnetism loss, and thus allowing the distance between communication device 10 and external device 30 to be long.

(Coil 14)

According to this embodiment, coil 14 is a coil for, e.g. Near Field Magnetic Induction (NFMI) communication. NFMI communication is performed between communication device 10 disposed inside the oral cavity and a wireless device disposed outside the oral cavity. Coil 14 extends slenderly along axis A14.

To provide the same advantage as that of coil 13, coil 14 as well preferably has an exclusive magnetic sheet. Communication device 10 according to the embodiment, however, includes magnetic sheet 15 overlapping coil 14 viewing from above. Resultantly, magnetic sheet 15 provides coil 14 with the advantage same as coil 12. Thus, communication device 10 does not necessarily include another magnetic sheet exclusive to coil 14.

Coil 14 is disposed below lower surface 15B of magnetic sheet 15 and above upper surface 16A of magnetic sheet 16. As shown in FIG. 1B, coil 14 is partly covered with magnetic sheet 15 viewing from above.

This configuration reduces the number of components and enhances the effective use of the space, reducing the size of communication device 10 and reducing the cost.

Coil 14 may be partly covered with magnetic sheet 16 as well as with magnetic sheet 15 viewing from below, as shown in FIG. 1C. Coil 14 covered with magnetic sheet 15 and magnetic sheet 16 allows the direction of magnetic flux passing through coil 14 to be controlled, which increases the directivity of an antenna for NFMI communication in the direction of axis A14.

In FIGS. 1B and 1C, coil 14 is partly covered with magnetic sheets 15 and 16. Coil 14 may be entirely covered with magnetic sheets 15 and 16, further increasing the directivity.

(Battery 17)

Battery 17 according to this embodiment is a secondary battery extending slenderly in longitudinal direction D17 and having substantially a cylindrical shape. Battery 17 is disposed such that longitudinal direction D17 of battery 17 is substantially parallel with longitudinal direction D11 of substrate 11. Battery 17 has portion 17P facing edge surface 11D of substrate 11. According to this embodiment, battery 17 is disposed inside cutout 11F provided in substrate 11 shown in FIG. 2.

According to this embodiment, battery 17 is, for example but not limited to, a pin lithium-ion battery having a diameter of about 4 mm and a length of about 20 mm in longitudinal direction D17.

If a case of battery 17 is made of magnetic substance, the temperature of battery 17 may increase due to induction heating. As shown in FIG. 1A, battery 17 of communication device 10 according to the embodiment is disposed between magnetic sheets 15 and 16. As shown in FIGS. 1B and 1C, magnetic sheet 15 covers the side of battery 17 viewing from above while magnetic sheet 16 covers the side of battery 17 viewing from below.

This configuration decreases the density of magnetic flux passing through the case of battery 17, reduces the influence of induction heating, and prevents the temperature rise of battery 17.

Battery 17 covered with magnetic sheets 15 and 16 as described above does not require another magnetic sheet for battery 17, hence reducing the size and thickness of communication device 10 at low cost.

In FIGS. 1B and 1C, magnetic sheets 15 and 16 cover a part of battery 17; however, magnetic sheets 15 and 16 may cover entire battery 17, further preventing the temperature rise of battery 17.

Battery 17 of communication device 10 according to the embodiment is covered with magnetic sheets 15 and 16. As described above, the diameter of coil 12 is larger than that of coil 13, resulting in the influence of induction heating by coil 12 larger than by coil 13. Thus, magnetic sheet 16 does not necessarily cover the side of battery 17 viewing from below, but only magnetic sheet 15 may cover the of battery 17 viewing from above.

(Electronic Component)

Electronic components 18 shown in FIG. 1A includes a microprocessor for example, electronic component 18A such as a DC/DC converter, that generates relatively large electromagnetic-wave noise.

Magnetic sheet 15 close to electronic component 18A generating electromagnetic wave noise allows the noise to propagate through magnetic sheet 15 to coil 14, decreasing the communication quality in NFMI communication. As shown in FIG. 1B, electronic component 18A of communication device 10 according to the embodiment is disposed as not to contact magnetic sheet 15. In other words, electronic component 18A is exposed from magnetic sheet 15 viewing from above. Similarly, in the case that electronic component 18A is disposed below lower surface 11B of substrate 11, electronic component 18A is disposed so as not to contact magnetic sheet 16 as shown in FIG. 1C, in order to prevent a decrease of the communication quality in NFC. In other words, electronic component 18A is exposed from magnetic sheet 16 viewing from below.

Communication device 10 has a size small enough to be used inside the oral cavity, and thus it does not have a space enough for electronic component 18 to be arbitrarily positioned on substrate 11. In communication device 10, a cutout provided in magnetic sheet 15 allows electronic component 18A disposed on upper surface 11A of substrate 11 to be exposed from the cutout in magnetic sheet 15 viewing from above. The cutout in magnetic sheet 16 allows electronic component 18A disposed on lower surface 11B of substrate 11 to be exposed from magnetic sheet 16 viewing from below. In communication device 10, a cutout formed in magnetic sheet 15 allows electronic component 18A to be exposed from magnetic sheet 15 viewing from above.

Figure 8:
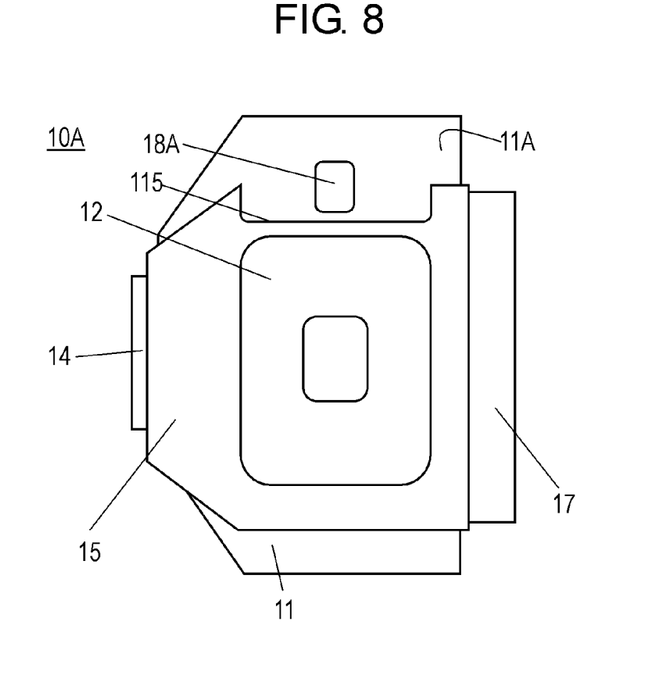
FIG. 8 is a top view of another communication device according to the embodiment.
Figure 9:
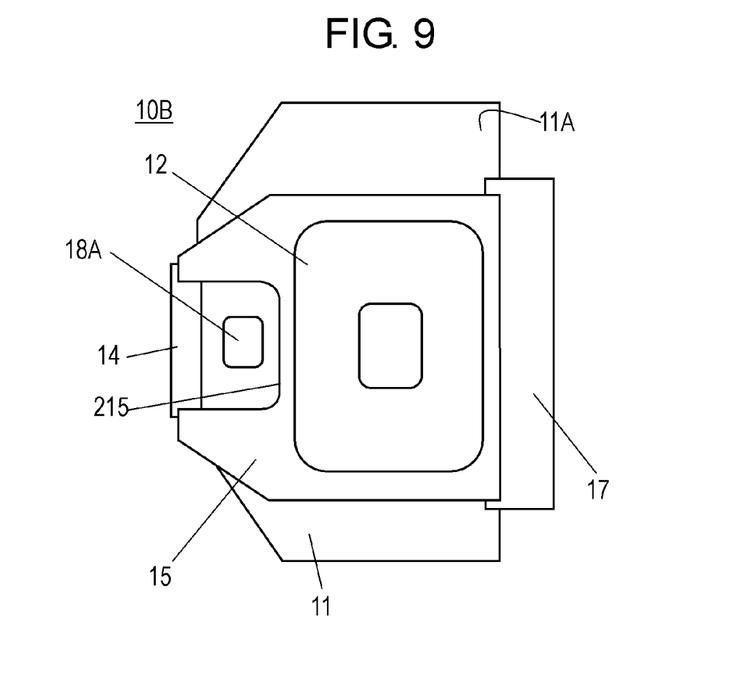
FIG. 9 is a top view of still another communication device according to the embodiment.

FIG. 8 is a top view of another communication device 10A according to the embodiment. FIG. 9 is a top view of still another communication device 10B according to the embodiment. In FIGS. 8 and 9, components identical to those of communication device 10 shown in FIGS. 1B and 1C are denoted by the same reference numerals. Communication devices 10A and 10B shown in FIGS. 8 and 9 includes magnetic sheet 15 having cutouts 115 and 215 provided therein, respectively. Cutouts 115 and 215 are positioned above electronic component 18A to expose electronic component 18A disposed on upper surface 11A of substrate 11 from magnetic sheet 15 viewing from above.

Figure 10:
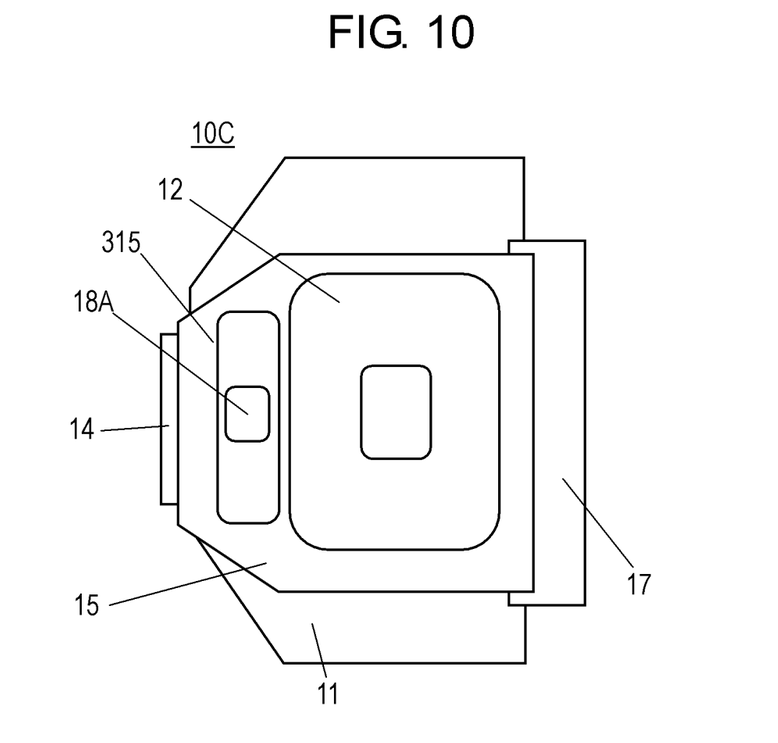
FIG. 10 is a top view of a further communication device according to the embodiment.

FIG. 10 is a top view of further communication device 10C according to the embodiment. In FIG. 10, components identical to those of communication device 10 shown in FIGS. 1B and 1C are denoted by the same reference numerals. Communication device 10C shown in FIG. 10 includes magnetic sheet 515 having aperture 315 formed therein. Aperture 315 is positioned above electronic component 18A to expose electronic component 18A disposed on upper surface 11A of substrate 11 from the aperture of magnetic sheet 15 viewing from above.

The above configuration prevents electromagnetic-wave noise emitted by electronic component 18A from transmitting through magnetic sheet 15. This configuration allows communication devices 10 and 10A to 10C to increase their efficiency of noncontact charging for stable wireless communication.

A cutout or aperture similar to cutouts 115 and 215 or aperture 315 provided in magnetic sheet 16 as well, electronic component 18A disposed on lower surface 11B of substrate 11 may be exposed from magnetic sheet 16.

(Magnetic Sheet)

According to the embodiment, magnetic sheets 15 and 16 may be, e.g. Ni—Zn based ferrite sheets, Mn—Zn based ferrite sheets, or Mg—Zn based ferrite sheets. A Mn—Zn based ferrite sheet is highly efficient in a low-frequency band. A Ni—Zn based ferrite sheet is highly efficient in a high-frequency band. According to this embodiment, therefore, magnetic sheet 15 disposed below coil 12 for noncontact charging that transmits power at approximately 100 kHz to 200 kHz is made of a Mn—Zn based ferriteسheet. Magnetic sheet 16 disposed above coil 13 for NFC that communicates at approximately 13.56 MHz is made of a Ni—Zn based ferrite sheet.

According to this embodiment, ferrite sheets is used for magnetic sheets 15 and 16; however, other materials may be used that have the same characteristics.

Communication device 10 (10A to 10C) is useful for small-size communication devices, especially for various wearable devices, such as a bone conduction auditory system used in the oral cavity.

In the embodiment, terms, such as "upper surface", "lower surface", "above", and "below", indicating directions indicate relative directions depending only on relative, positional relationships between components, such as substrate 11, magnetic sheets 15 and 16, and coils 12, 13, and 14, of communication device 10, and do not indicate absolute directions such as a vertical direction.

What is claimed is:

1. A communication device comprising:
   a substrate having an upper surface, a lower surface, and a first edge surface connecting to the upper surface and the lower surface;
   a magnetic sheet disposed above the upper surface of the substrate;
   a first coil disposed above an upper surface of the magnetic sheet;
   a second coil having a portion facing the first edge surface of the substrate in a direction parallel with the upper surface of the substrate; and
   an electronic component disposed on the upper surface of the substrate, the electronic component configured to generate noise,
   wherein the magneticسheet has a portion overlapping the second coil in a thickness direction of the magnetic sheet, and
   wherein the electronic component does not overlap the magnetic sheet in the thickness direction of the magnetic sheet such that the electronic component is exposed from the magnetic sheet when viewed in plan.

2. The communication device of claim 1,
   wherein the first coil generates power from external magnetic flux and functions as a coil for noncontact charging, and
   wherein the second coil functions as a coil for a communication by Near Field Magnetic Induction with an external device.

3. The communication device of claim 2, further comprising a battery configured to be charged from the power generated by the first coil.

4. The communication device of claim 3,
   wherein the substrate further has a second edge surface connected to the upper surface and the lower surface of the substrate and disposed opposite to the first edge surface, and
   wherein the battery has a portion facing the second edge surface in a direction parallel with the upper surface of the substrate.

5. The communication device of claim 4, wherein the magnetic sheet has a portion overlapping the battery in the thickness direction of the magnetic sheet.

6. The communication device of claim 3, wherein the magnetic sheet has a portion overlapping the battery in the thickness direction of the magnetic sheet.

7. The communication device of claim 1, wherein the second coil overlaps with the first edge surface of the substrate in a length direction of the substrate.

8. The communication device of claim 1, wherein the first coil overlaps with the substrate in a longitudinal direction of the first coil.

9. The communication device of claim 8, wherein the second coil overlaps with the substrate in a longitudinal direction of the second coil.

* * * * *